US008731899B2

United States Patent
Mahr et al.

(10) Patent No.: US 8,731,899 B2
(45) Date of Patent: May 20, 2014

(54) ADAPTER ASSEMBLY FOR CONCURRENT EMULATION OF A NATIVE CHANNEL

(75) Inventors: Jay Alan Mahr, Lyons, CO (US); Jim Everett Wilson, Longmont, CO (US); Todd Charles Thaler, Longmont, CO (US)

(73) Assignee: Seagate Technology LLC, Scotts Valley, CA (US)

(*) Notice: Subject to any disclaimer, the term of this patent is extended or adjusted under 35 U.S.C. 154(b) by 1493 days.

(21) Appl. No.: 12/035,182

(22) Filed: Feb. 21, 2008

(65) Prior Publication Data

US 2009/0006073 A1    Jan. 1, 2009

Related U.S. Application Data

(60) Provisional application No. 60/937,753, filed on Jun. 29, 2007.

(51) Int. Cl.
  *G06F 9/455* (2006.01)
  *G06F 13/00* (2006.01)
  *G06F 13/28* (2006.01)
  *G11B 21/02* (2006.01)

(52) U.S. Cl.
  USPC ............... 703/27; 703/25; 711/112; 710/316; 360/75

(58) Field of Classification Search
  USPC .......... 703/27, 25; 711/112; 710/316; 360/75
  See application file for complete search history.

(56) References Cited

U.S. PATENT DOCUMENTS

| | | | |
|---|---|---|---|
| 4,633,417 A | 12/1986 | Wilburn et al. | |
| 5,438,674 A | 8/1995 | Keele et al. | |
| 5,603,002 A * | 2/1997 | Hashimoto | 711/113 |
| 5,661,848 A * | 8/1997 | Bonke et al. | 711/112 |
| 5,838,512 A * | 11/1998 | Okazaki | 360/51 |
| 6,018,432 A * | 1/2000 | Ukani | 360/69 |
| 6,266,203 B1 * | 7/2001 | Street et al. | 360/69 |
| 6,483,853 B1 | 11/2002 | Kshirsagar et al. | |
| 6,574,196 B1 | 6/2003 | Lee | |
| 6,665,149 B2 * | 12/2003 | Abe | 360/264.2 |
| 6,690,546 B2 * | 2/2004 | Gouo | 360/244.1 |
| 6,711,520 B2 | 3/2004 | Arnaout et al. | |
| 7,100,130 B2 | 8/2006 | Mauersberger | |
| 7,290,184 B2 | 10/2007 | Bruner et al. | |
| 7,761,647 B2 * | 7/2010 | Yang | 710/316 |
| 2003/0218815 A1* | 11/2003 | Loh et al. | 360/31 |
| 2006/0174049 A1* | 8/2006 | Lin et al. | 710/308 |
| 2008/0189465 A1* | 8/2008 | Yang | 710/316 |

OTHER PUBLICATIONS

Julie, "USB 2.0 to SATA/IDE Adapter with one Touch Backup", Aug. 7, 2006.*
Disk Geometry, "Disk Geometry: How Data is Organized on a Hard Disk Drive", 2002.*

* cited by examiner

*Primary Examiner* — Omar Fernandez Rivas
*Assistant Examiner* — Angel Calle
(74) *Attorney, Agent, or Firm* — Hall Estill Attorneys at Law

(57) ABSTRACT

Various embodiments of the present invention are generally directed to an apparatus and method for recovering data from a signal generator using a native communication channel and an emulated communication channel coupled in parallel to the native communication channel.

20 Claims, 5 Drawing Sheets

ADAPTER ASSEMBLY FOR CONCURRENT EMULATION OF A NATIVE CHANNEL

RELATED APPLICATIONS

The present application makes a claim of domestic priority to U.S. Provisional Patent Application No. 60/937,753 filed Jun. 29, 2007, which is hereby incorporated by reference.

BACKGROUND

Communication channels are generally used to process transmitted data. Such channels are useful in a variety of applications, such as telecommunications systems and data storage devices.

In some communication channels, an input (e.g., analog) signal is sampled to provide a corresponding series of discrete (e.g., digital) samples. A variety of data recovery techniques can then be applied to the discrete samples to reconstruct the informational content of the input signal. Such recovery techniques can include partial-response, maximum likelihood (PRML) and decision-feedback equalization (DFE).

Input signals can be encoded, such as with error correction (ECC) and rim-length limited (RLL) encoding. Channel recovery processing thus often includes appropriate decoding steps to remove the encoded components of the transmitted signals to arrive at the underlying user data.

It may be desirable from time to time to evaluate a prospective channel design for a given application, such as in the case of qualifying a new vendor to supply components in the ongoing manufacture of an existing product, in specifying the particular channel configuration and channel parametrics for a new product design, etc. Such evaluations can be difficult and resource intensive.

One common evaluation approach is to use an arbitrary waveform generator (AWG), which is a device that can "mimic" various types of circuitry. The AWG is used to simulate various input signals that may be experienced in a given product environment. An emulation system in the form of hardware and/or software is coupled to the AWG, and emulates a selected channel configuration to process the input signals.

A limitation with this approach is the inability to reproduce complex types of signals of the type that would likely result from various "real world" operational conditions. Thus, the evaluation process may result in the selection of a channel design that provides less than optimal performance in the real world.

SUMMARY

Various embodiments of the present invention are generally directed to an apparatus and method for recovering data from a signal generator using a native communication channel and an emulated communication channel coupled in parallel to the native communication channel.

In accordance with some embodiments, an apparatus generally comprises an adapter assembly configured to establish a communication path between a data processing device and a data evaluation device. The adapter assembly is coupled between a native channel and a signal generator of the data processing device to condition and forward a data signal from the signal generator to an emulated channel of the data evaluation device. A servo data portion of the data signal is demodulated by the native channel, and a user data portion of the data signal is decoded by the emulated channel.

In accordance with other embodiments, an apparatus generally comprises a native device comprising a signal generator coupled to a native communication channel, a data evaluation board comprising an emulated communication channel with a parametric configuration that is different from a parametric configuration of the native communication channel, and first means for coupling the signal generator to the emulated communication channel. The first means is configured such that, during operation of the native device, the emulated communication channel decodes a data signal generated by the signal generator in response to at least one control signal output by the native channel.

In yet further embodiments, a method generally comprises coupling an adapter assembly between a native device and a data evaluation device to establish a communication path having a first end between a signal generator and a native channel of the native device and a second end in communication with an emulated channel of the data evaluation device. The signal generator is used to generate a data signal. A first set of data is recovered from the generated data signal using the native channel, and a second set of data is concurrently recovered from the generated data signal using the emulated channel.

DETAILED DESCRIPTION

Figure 1:
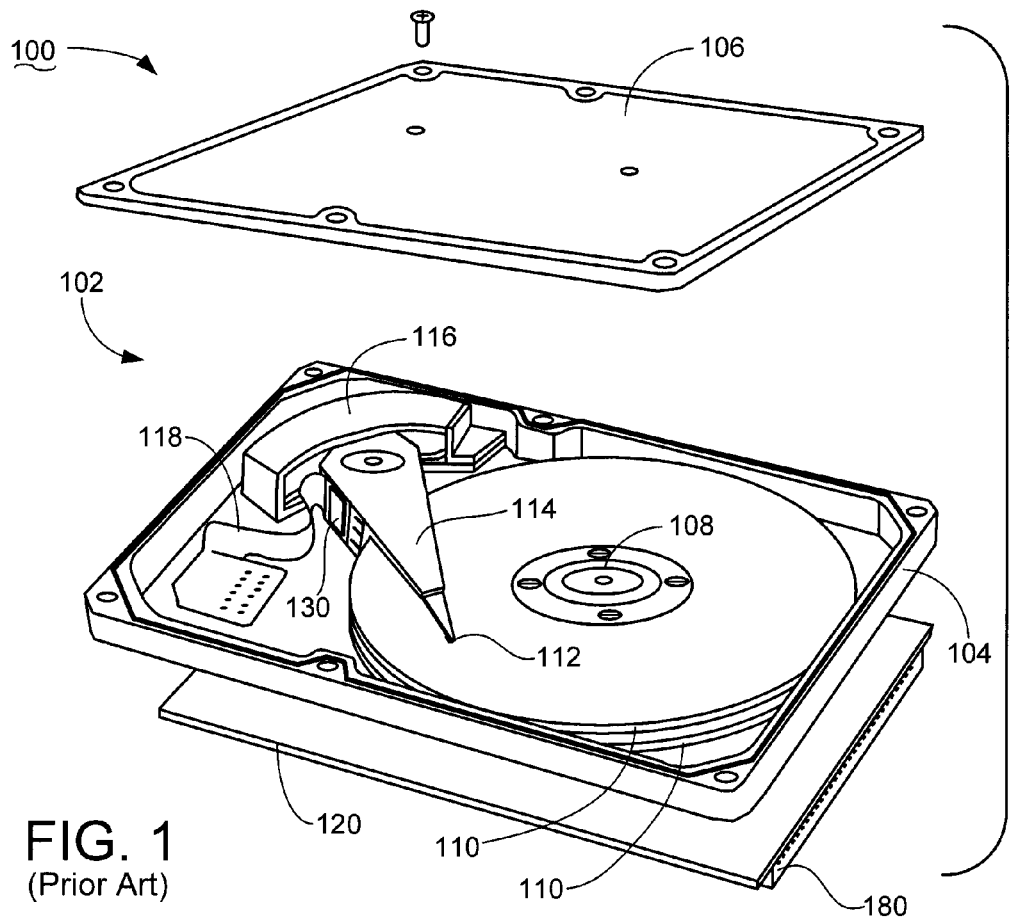
FIG. 1 is an exploded view of an exemplary data storage device constructed and operated in accordance with various embodiments of the present invention.

FIG. 1 shows an exploded view of a data storage device 100 to provide an exemplary environment in which various embodiments of the present invention can be advantageously practiced. The data storage device 100, also referred to herein as an exemplary data processing device, is of the type used to store and retrieve digital data in a computer system or network, consumer device, etc. It will be appreciated that various embodiments as presented herein can be used with other types of data processing devices, such as voice and/or data communication devices, information display systems, solid state and/or optical memory storage devices, etc.

The device 100 includes a rigid, environmentally controlled housing 102 formed from a base deck 104 and a top cover 106. A spindle motor 108 is mounted within the housing 102 to rotate a number of data storage media 110 (also "storage memory" or "discs") at a selected velocity.

Data are arranged on the media 110 in concentric tracks which are accessed by a corresponding array of data transducing heads 112 (transducers). Each head 112 and disc 110 combination defines a separate head-disc interface.

The heads 112 are supported by an actuator 114 and moved across the media surfaces by application of current to a voice coil motor, VCM 116. A flex circuit assembly 118 facilitates communication between the actuator 114 and control circuitry on an externally mounted printed circuit board, PCB 120.

Figure 2:
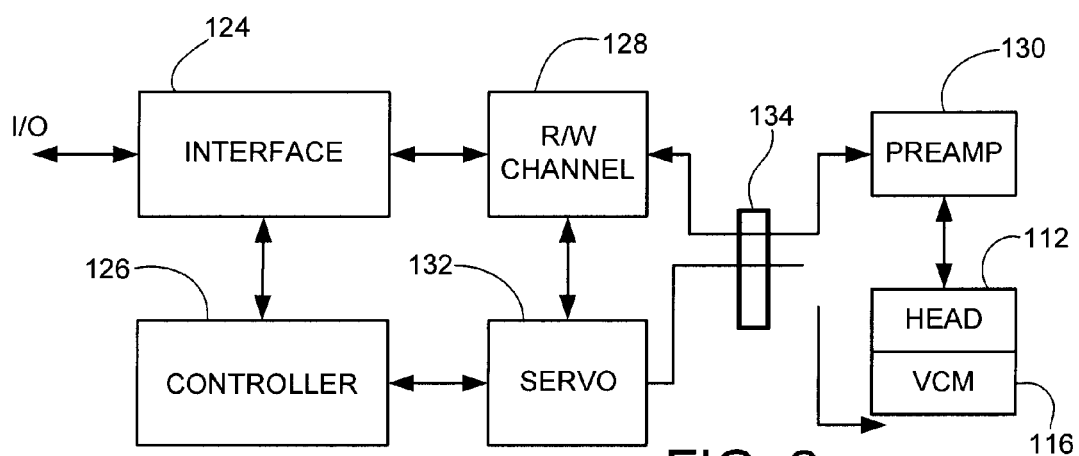
FIG. 2 is a generalized functional block diagram of the device of FIG. 1.

As shown in FIG. 2, the control circuitry preferably includes an interface circuit 124 which communicates with a host device using a suitable interface protocol. A top level processor 126 provides top level control for the device 100 and is characterized as a programmable, general purpose processor with suitable programming to direct the operation of the device 100.

A communication channel 128 (also referred to herein as a read/write, or R/W channel) operates in conjunction with a preamplifier/driver circuit (preamp) 130 to write data to and to recover data from the discs 110. The preamp 130 is mounted to the actuator 114 within the interior environment of the housing 102, as shown in FIG. 1.

A servo circuit 132 provides closed loop positional control for the heads 112 and adjusts head position by applying the aforementioned control currents to the VCM 116. Data and control signals between the externally mounted PCB 120 and the internally mounted actuator 114 are passed via a bulkhead connector (BHC), represented generally at 134 in FIG. 2. Although not visible in FIG. 1, it will be understood that the BHC 134 sealingly extends through the base deck 104 to present upper contacts which mate with an underside surface of the flex circuit 118, and lower contacts which interconnect with the PCB 120.

Figure 3:
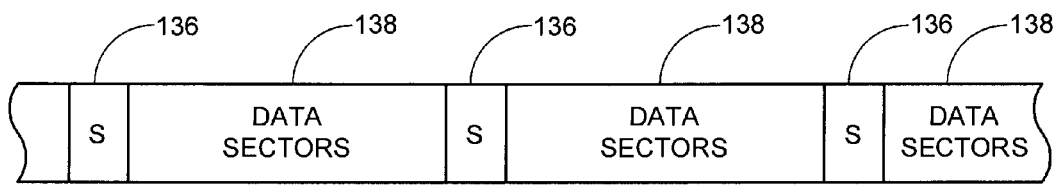
FIG. 3 illustrates a preferred manner in which data are stored and presented by the storage device.

Data are generally stored to the media 110 along concentric tracks having a format as generally shown in FIG. 3. Servo data are embedded in the form of spaced apart servo fields 136. The servo fields 136 provide positional information to the servo circuit 132 to enable the servo circuit to accurately position the heads 112 with respect to the tracks. The servo data are written during device manufacturing as a sequence of spaced apart servo wedges that extend from the innermost diameter (ID) to the outermost diameter (OD) of the media surfaces.

Data sectors 138 are formed in the regions between adjacent servo sectors 136. The data sectors 138 store user data in fixed-sized blocks, and maybe identified at the host level using logical block addresses (LBAs). A host command to read a selected file may be communicated as a request to retrieve a particular set of LBAs associated with that file. The device 100 will determine the associated physical block addresses (PBAs) for the requested data, move the appropriate head(s) to the associated track(s), and initiate a data transfer to return the blocks to the requesting host device.

Figure 4:
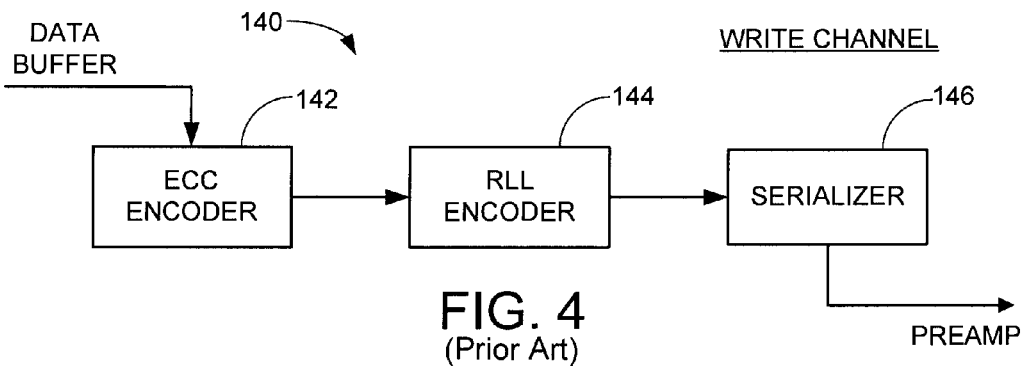
FIG. 4 is a simplified functional representation of a write channel portion of the communication channel of FIG. 2.

The communication channel 128 supports both reading and writing operations. FIG. 4 illustrates a write channel portion 140 of the communication channel 128 in FIG. 2 in accordance with various preferred embodiments, although other write channel configurations can readily be used. The write channel 140 operates to transform input data from a data buffer or other source into a suitable form for processing by the preamp 130 and writing by the associated head 112 to disc 110.

An error correction code (ECC) block 142 appends Reed-Soloman or similar code words to the input data. The code words are selected for each portion of the input data so that the combination maps into a predefined mathematical construct. During subsequent readback of the data, erroneous data symbols will not map into the set of defined combinations and can thus be individually identified. Depending upon the selected ECC algorithm, up to a selected number t of erroneous data symbols can be detected and a selected number of the erroneous data symbols can be corrected by the ECC code words. As desired, the ECC encoder 142 may rearrange the input sequence of the input data to form interleaves, and then form the code words in relation to the interleaves.

The encoded words from block 142 are subjected to run-length limited (RLL) encoding by RLL encoder 144. As will be recognized, RLL encoding involves a transformation of m input bits into n encoded bits where m<n (and usually, n=m+1). Exemplary m/n RLL encoding schemes include 8/9, 20/21 and 99/100. RLL encoding is typically provided to meet specified constraints on the allowable minimum and maximum number of logical 0's between consecutive logical 1's in the bit stream.

Such constraints are often required since the periodic occurrence of logical 1's (transition pulses) in a readback signal are used as a control input to a timing circuit used to time search windows for pulses in the retrieved bit stream. Allowing too much elapsed time between consecutive pulses can cause the timing circuit to lose frequency lock on the readback signal, whereas providing consecutive pulses too close together can reduce the ability of the channel to subsequently identify the individual pulses.

The RLL encoded data from block 144 are provided to serializer 146, which generates a serialized, frequency modulated bi-level signal such as in NRZI (non-return to zero) format. The serialized signal is applied to the preamp 130 which applies corresponding write currents to the associated head 112 to place magnetic flux transitions in relation to the level transitions in the NRZI signal.

Figure 5:
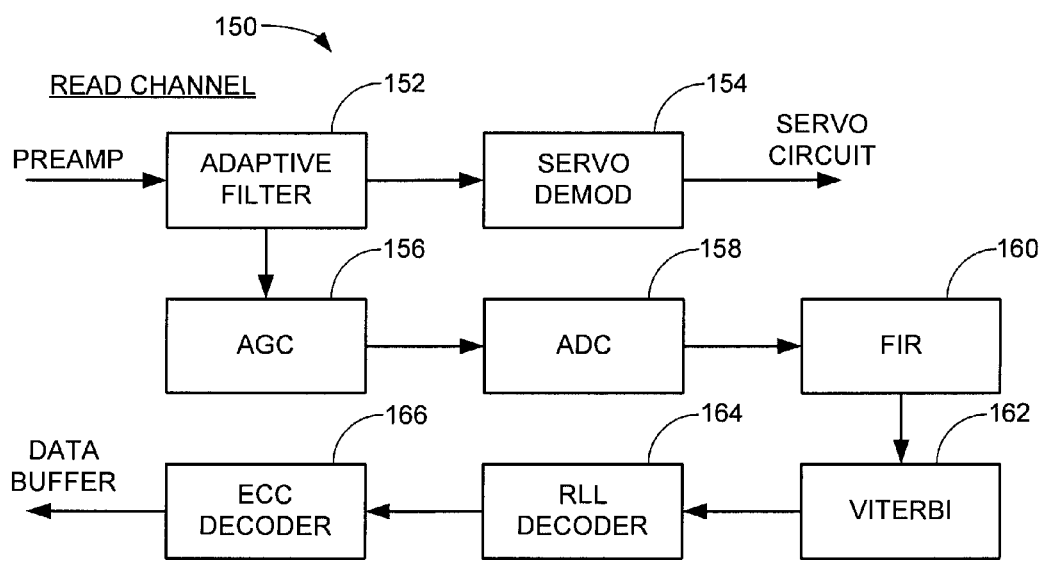
FIG. 5 is a simplified functional representation of a read channel portion of the communication channel of FIG. 2.

FIG. 5 illustrates a read channel portion 150 of the communication channel 128 in FIG. 2. The read channel 150 in FIG. 5 applies the requisite signal processing to reconstruct the data previously stored to disc to allow the data to be retrieved to a host device. Read channels can take any number of configurations, so as with FIG. 4, the exemplary arrangement of FIG. 5 is merely for purposes of illustration and is not limiting.

Input data read from a selected host-disc interface are conditioned by the preamp 130 and filtered by an adaptive filter 152. During a read operation the data from a selected track will include both servo data from the servo fields 136, and user data from the data sectors 138 (FIG. 3). Servo data portions of the readback signal are forwarded to servo demodulation circuitry 154 for processing by the servo circuit, and readback data from the sectors 138 are forwarded to remaining portions of the channel 150 for reconstruction of the originally stored user data.

An automatic gain control (AGC) block 156 normalizes signal amplitudes in the readback signals, and digital samples of the normalized signals are obtained from an analog-to-digital converter (ADC) 158. A finite impulse response (FIR) block 160 utilizes a series of internal delay blocks and tap weight coefficient addition blocks to filter sequential groups of the samples to a selected class of partial-response waveforms, such as EPR4.

A Viterbi detector 162 decodes the processed sequence such as through the use of maximum-likelihood detection to provide encoded data values. RLL decoding and ECC decoding take place at blocks 164 and 166, respectively, to return the originally stored data to the buffer.

It will be noted at this point that the write channel 140 of FIG. 4 and the read channel 150 utilize a number of different parameters during operation to process the data during write and read operations, including ECC and RLL schemes, filter settings, tap weights and coefficients, recording frequency ranges, etc. Such parametrics affect the manner in which the data are ultimately stored to the media 110 and retrieved therefrom. Similarly, various electrical and mechanical response characteristics of the head-disc interface and preamp can influence the range of configuration and parameterization options for the channel 128.

Figure 6:
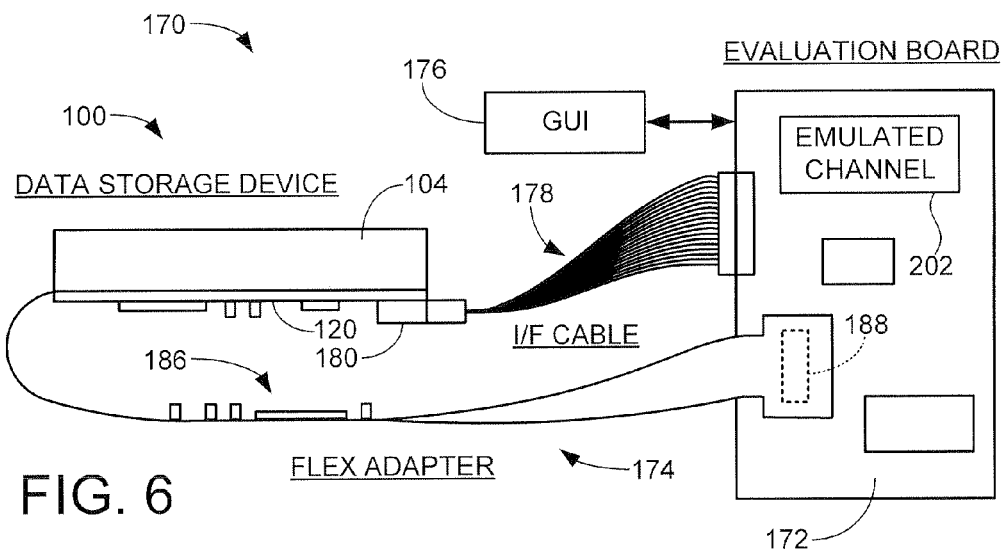
FIG. 6 provides a generalized depiction of an evaluation system incorporating the storage device of FIG. 1.

Accordingly, FIG. 6 provides a generalized representation of a channel evaluation system 170 constructed in accordance with various embodiments of the present invention. The system 170 advantageously operates to emulate and evaluate a given potential channel configuration for the data storage device 100.

The system 170 generally comprises an evaluation board 172 (also referred to as a "data evaluation device") and an adapter assembly 174 (also referred to as a "flex adapter"). The evaluation board 172 is preferably resident in a desktop computer or similar and is configured to emulate a variety of different channel configurations through user inputs provided via a graphical user interface (GUI) 176. The evaluation board 172 can take any number of forms, including boards offered by various channel suppliers. One suitable board for some applications is available from LSI Corporation, Milpitas, Calif., USA and is referred to herein as the Agere Systems Channel Integration Board.

A standard host and data interface (I/F) cable 178 couples the board 172 with an I/O connector 180 of the storage device 100 (see FIG. 1). An additional connection is made between the evaluation board 172 and the storage device 100 via the flex adapter 174, as explained below.

Figure 7:
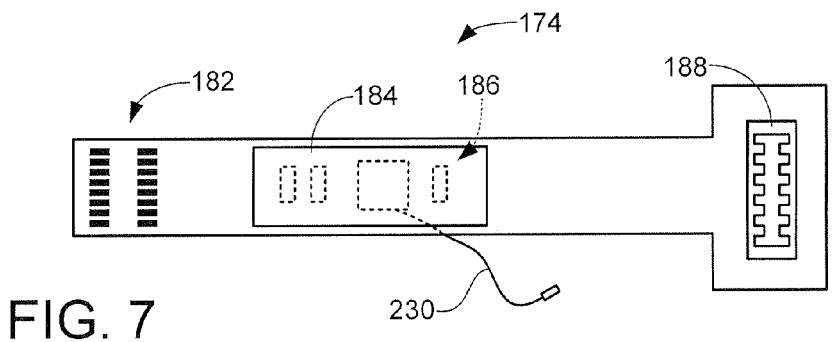
FIG. 7 is a plan representation of a flex adapter of FIG. 6 which couples the storage device to an evaluation board.
Figure 8:
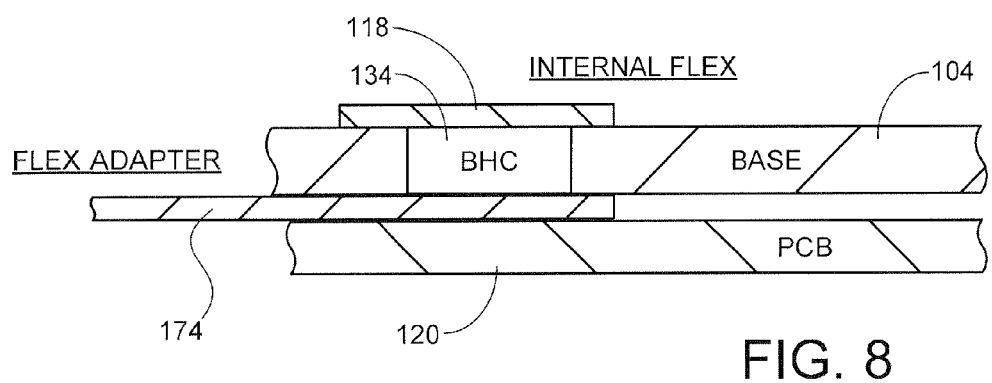
FIG. 8 provides a cross-sectional, elevational representation of a preferred coupling arrangement between the storage device and the flex adapter.

FIG. 7 provides a bottom plan representation of the flex adapter 174. The flex adapter preferably comprises an elongated, substantially t-shaped laminated flex cable. Electrically conductive pads 182 are located at a first end of the flex cable to allow the cable to extend between the data storage device PCB 120 and the base deck 102, as represented in FIG. 8. The pads 182 intercept signal paths which pass via the bulkhead connector (BHC) 134 without interfering with normal communications between the BHC 134 and the PCB 120.

One or more metal stiffener plates 184 are preferably provisioned along a medial portion of the flex cable to support conditioning circuitry 186 on the top side of the cable. An insertion connector 188 at the opposing second end of the flex adapter 174 couples to a mating connector on the evaluation board 172.

Figure 9:
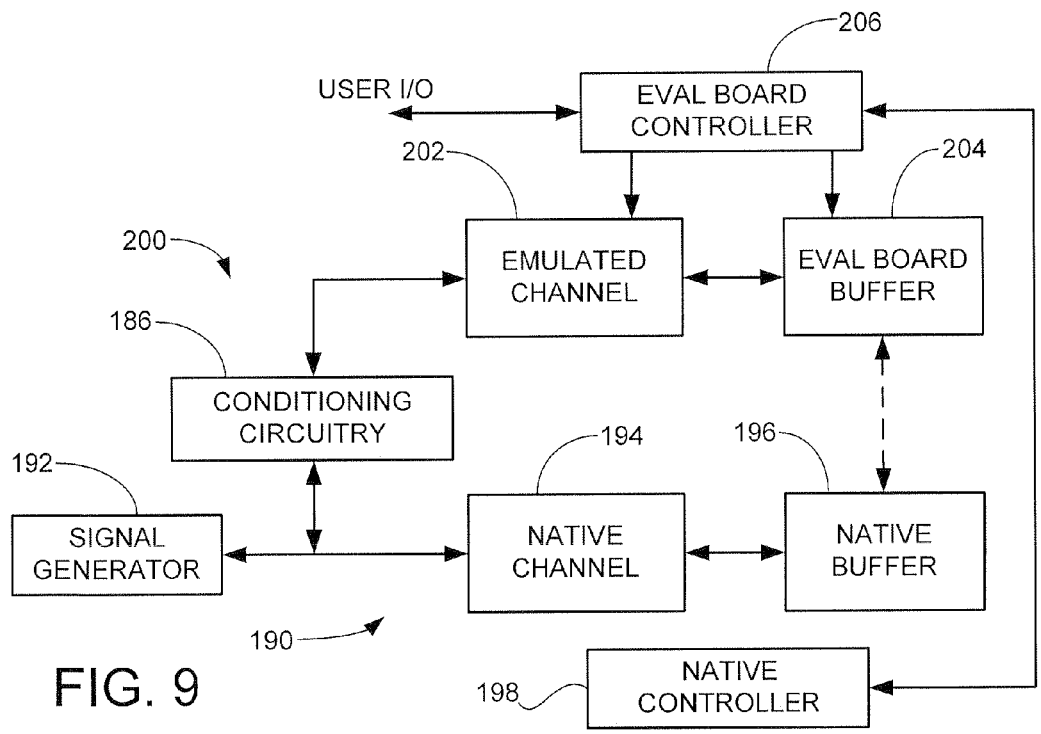
FIG. 9 is a functional block representation of the system of FIG. 6.

FIG. 9 shows a functional representation of an evaluation system 200 generally corresponding to the system 170 of FIG. 6. A native data processing device 190 comprises a native signal generator block 192, native channel 194, native buffer 196 and native controller 198. The signal generator block 192 preferably corresponds to the head-disc interface (HDI) and preamp combination of FIG. 2, although the input signals can be generated from other sources in non-data storage device applications.

The evaluation board 172 is shown in FIG. 9 to include an emulated channel 202, a data buffer 204 and a top level controller 206. The emulated channel 202 is arranged in parallel with the native channel 194, and is configured via hardware and/or software to emulate a particular channel configuration in relation to user selectable inputs. As channel emulation techniques are well known to those with skill in the art, further discussion of the specific configuration of the emulated channel 202 is unnecessary and therefore omitted, apart from noting that the emulated channel preferably operates in "real time" on "real world" signals.

Generally, during operation a set of signals is output by the signal generator 192. These signals are concurrently processed in parallel by both the native channel 194 and the emulated channel 202. Host level commands to initiate such transfers are provided to the device 190 from the top level controller 206. The native channel 194 is further preferably used to provide certain types of control signals (assertion, enable, gate, etc.) to initiate operation of the signal generator 192. Each of these aspects of operation will be discussed in detail below.

It will be appreciated that the channel configuration emulated by the evaluation board 172 may be for a readback signal format that is significantly different from that for which the native write channel (FIG. 4) is set up to record, and is significantly different from that for which the native read channel (FIG. 5) is able to decode. This is readily accommodated by the evaluation board 172, which inserts the written data directly to the head-disc interface through the flex adapter 174 in the desired format.

It will be recalled from FIG. 3 that the readback signals transduced by the HDI along a particular track will have both a servo data component (servo fields 136) and a user data component (data sectors 138). During readback, the native channel 194 preferably processes the servo data portions to maintain servo control of the HDI. The native channel 194 may further process the user data components of the readback signals and pass what it can to the native buffer, with the understanding that what is returned by the native device 190 may not be useable (or recognizable) data patterns.

Commands to initiate a readback process are communicated to the native controller 198 from the top level controller 206, preferably via the standard I/O interface (cable 178 and connector 180 in FIG. 6). Various servo control commands, such as maintaining the operation of the spindle motor 108 and the seeking of the actuator 114 to place a particular head 112 on a selected track, are carried out by the native device 100 as controlled by the controller 206.

Figure 10:
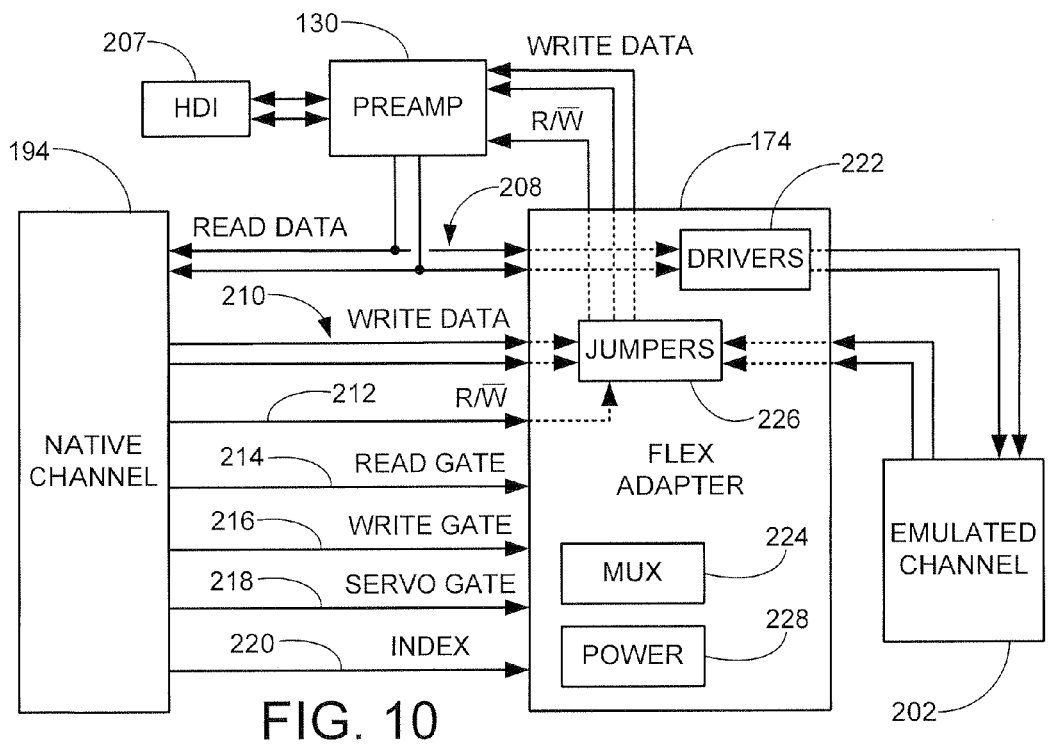
FIG. 10 generally depicts various data and control signals transferred between the flex adapter and the storage device during operation of the system of FIG. 6.

As shown in FIG. 10, the conditioning circuitry 186 of the flex adapter 174 is configured to pass various control and data signals between the emulated channel 202, the native channel 194 and the signal generator block (in this case, preamp 130 and selected HDI 207). Differential read data and write data signals are provided on paths 208 and 210, respectively. Evaluation write data are preferably sent to the preamp 130 on paths 210 in a format that can be processed by the preamp in an otherwise conventional manner for writing by the HDI 207. When these previously written data are readback, the preamp applies the otherwise conventional preamplification and normal signal processing that it normally gives to native signals, and the flex adapter 174 intercepts the same to provide to the emulated channel 202.

Additional signals shown in FIG. 10 are a read/write assertion signal (R/$\overline{w}$) on path 212; read gate, write gate and servo gates (enable signals) on paths 214, 216 and 218, respectively; and a once-around index signal on path 220. The number and types of signals passed by the flex adapter 174 are selected in relation to the requirements of a given application, and thus can vary as required. Generally, however, the signals passed are those sufficient to pass whatever information is required for the signal generator to operate in a normal fashion. Thus, additional signals, such as head selection signals, are also passed as required.

At this point it will be noted that the various assertion and gate signals (collectively "control signals") depicted in FIG. 10 are preferably generated by the native channel 194 and provided to the signal generator 192, which in response thereto generates the input signals that are processed by the emulated channel 202. This advantageously allows the device 190 to operate as an otherwise normal device in an otherwise normal processing environment.

The assertion signal on path 212 and the various gate signals on paths 214, 216 and 218 enable or inhibit the respective read, write and servo operations in the same manner as such signals are generated during normal operation. This prevents, for example, the unintended overwriting of the servo fields 138 with user data sectors during device operation, etc.

The conditioning circuitry 186 preferably comprises signal conditioning and routing circuitry to minimize the signal degradation and/or delay effects that may be induced by the offloading of the signals from the device 190. Such circuitry may include appropriate drivers 222, multiplexer (mux) selection circuitry 224, manually selectable jumpers 226, power source circuits 228, etc. For example, the jumpers 222 can be used to manually select whether write signals from the native channel 194 or write signals from the emulated channel 202 are respectively forwarded to the preamp 130.

In preferred embodiments, the adapter facilitates the ability to tap and insert the necessary control signals to either transmit or receive the desired signals of interest. Individual jumper paths, such as denoted at 230 in FIG. 7, may be used to access points on the PCB 120 or elsewhere on the device 190 that are located other than at the BHC 134.

Figure 11:
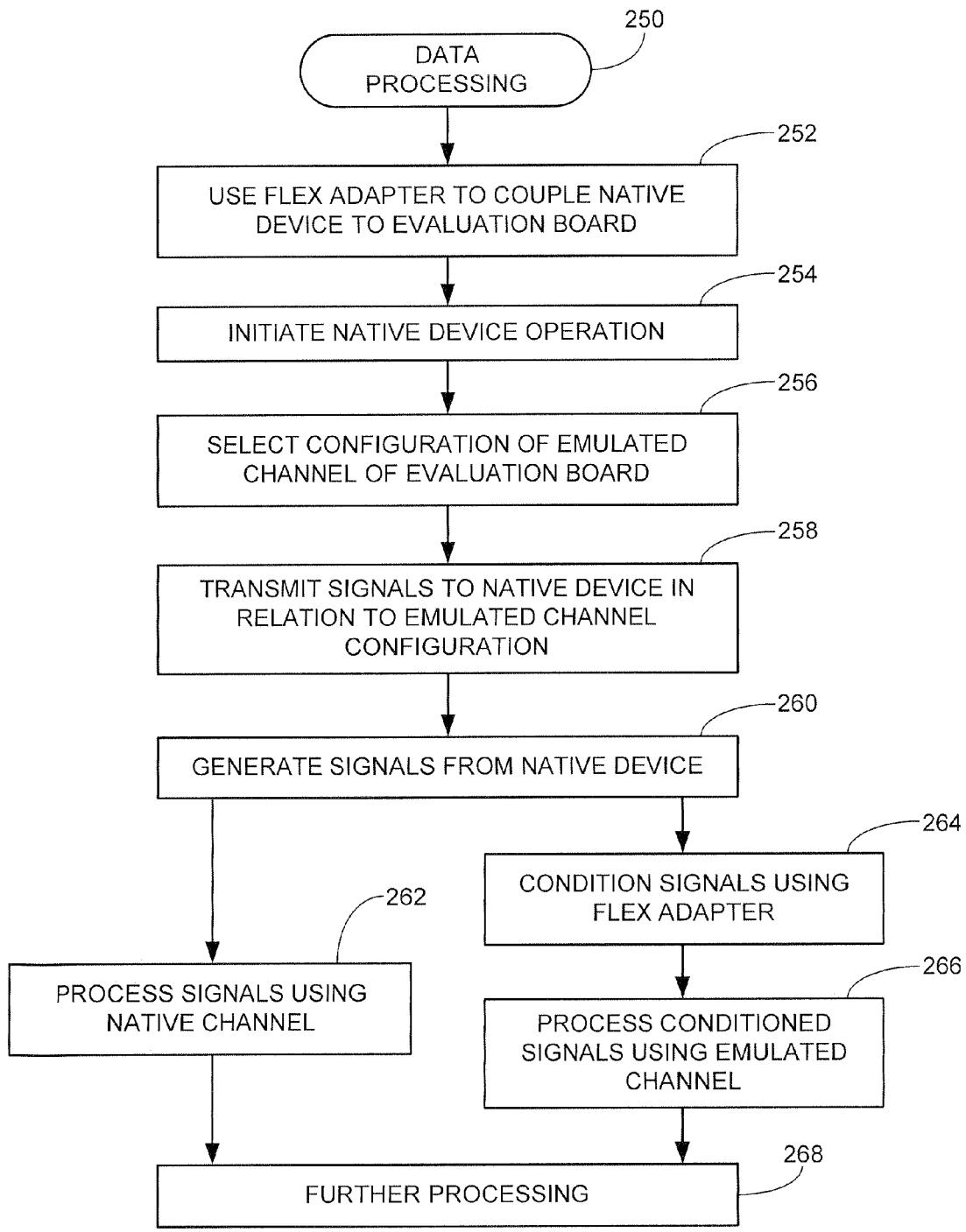
FIG. 11 is a flow chart for a DATA PROCESSING routine.

FIG. 11 provides a flow chart for a DATA PROCESSING routine 250, generally illustrative of steps carried out in accordance with preferred embodiments of the present invention.

Initially, at step 252 an adapter assembly such as the flex adapter 174 is used to couple an evaluation board such as 172 with a native device such as 190. This interconnection preferably intercepts an existing connection path between a native channel 194 of the native device 190, and a signal generator 192 which normally provides signals to the native channel. Thus, while preferred, it is not necessarily required that the signal generator physically form a part of the native device. Other communication paths are also preferably established during step 252, such as the I/F cable 178 in FIG. 6, to couple the evaluation board 172 with the native device 190.

At step 254, normal device operation is initiated by the evaluation board 172 over the native interface. In the case of the data storage device 100, such normal operation may include an acceleration of the media 110 to operational velocity, the loading of the heads 112, and the requisite servo synchronization to place the device in a state ready to transfer data.

Parametrics are selected at step 256 for the operable emulated channel 202 on the evaluation board 172. Such parametrics may include channel stricture (partial response maximum likelihood, decision feedback equalization, etc.), frequency rates at which data are to be recorded and received, encoding schemes (ECC, parity, RLL encoding, etc.), sync mark format and detection, sampling and filtering settings, and so on. The parametrics will preferably configure both the write channel portion and the read channel portion of the emulated channel. It is contemplated that the emulated channel will have a different configuration than the native channel 194, and the routine 200 will operate to facilitate evaluation of the emulated channel in terms of suitability for use in, or compatibility with, the native device.

Step 258 entails the transmission of data from the evaluation board 172 in a format suitable for decoding by the readback portions of the emulated channel. In the case of the data storage device 100, the data are preferably write data to be written to the appropriate head-disc interface in a format recoverable by the emulated channel. It is noted that various commands are issued to the native device, such as a command to carry out an appropriate seek to the destination track (or tracks), to prepare the native device for the storage operation.

With reference again to FIG. 9, the transmitted data preferably originate from the evaluation board buffer 204, are processed by the emulated channel 202 in accordance with the emulated write channel portion thereof, and conditioned by the conditioning circuitry 186 prior to presentation to the signal generator 192 where, in the case of the storage device 100, the preamp 130 directs the writing of data by the HDI 207.

As desired, the evaluation board 172 can further command the native device to carry out a write operation as well, including providing the same (or dummy) data to the native buffer 196 for writing to the associated medium 110. Such operations may further help "synchronize" the off-board emulation of the native channel. Indeed, write signals can be generated by the native channel 194 in a normal fashion, provided such are intercepted and not actually output to the preamp 130 (such as by use of the jumpers 222 in FIG. 10, etc.).

Generally, preferred embodiments operate to cause, to the extent possible, the native device to behave in a wholly normal, real-world fashion while the actual write signals originate from the evaluation board 172. The same is true during the subsequent readback of the transmitted signals as the user data portions thereof are processed by the emulated channel 202.

With reference again to FIG. 10, it will be noted that the appropriate write assertion, write gate and servo gate signals will be asserted as necessary to carry out the writing operation for the system as configured in FIG. 7. The use of the native channel 194 to generate such control signals advantageously maintains operational synchronization between the native device and the evaluation board, and better represents real world device operation.

It is contemplated that any number of user data sectors, on any number of tracks and for any number of different heads, can be written with data during step 258. The actual data are preferably forwarded at the appropriate times to the preamp 130 via the write data paths 210 in FIG. 10. It will be noted that it is not necessarily required that the step 258 be carried out at all, but it is contemplated that such will be preferred in recording type applications so as to set up the basis for the signals that will be subsequently output by the signal generator 192.

Continuing with FIG. 11, input signals are next generated by the native device 190 at step 260. In the context of the data storage device 100, such signals can comprise readback signals that are transduced from the associated head-disc interface. Such signals preferably comprise both servo data and user data portions, with the user data portions corresponding to that data written during step 258. In order to accurately evaluate the emulated channel, it is desired that the signals generated and output at step 260 constitute real-world type signals with characteristics and aspects associated with the actual physical construct of the device.

Thus, the signals can be generated in accordance under any number of operational conditions. For example, a selected amount of off-track variation can be commanded via the native device servo system to place the head to one side of the center of the recorded path (e.g., 15% off track in a selected direction). The data can be written to provide readback signals for different track spacings to evaluate real world effects of track squeeze.

Multiple repetitive writings to the same sectors (including repetitively writing thousands of times) can be carried out and readback signals determined therefor. Overvoltage, high temperature, or any number of other environmental conditions can be applied to see how the emulated channel reacts. The use of the native device as the signal generator thus allows any number of real world operational conditions to be immediately and directly evaluated. Preferably, the various requisite control signals, such as read gates, index signals, etc. are generated by the native channel 194 during this step, and the readback data are forwarded along paths 208 in FIG. 10.

The readback signals generated by the signal generator portion are preferably routed to the native channel 194 for signal reconstitution and outputting of data to the native buffer 196, as indicated by step 262. As noted above, the readback signals may be of a sufficiently different format as to prevent the native channel 194 from successfully discerning the originally stored (or otherwise transmitted) user data content, depending on the parametric differences between the native channel 194 and the emulated channel 202.

In such cases, it may be necessary for the top level controller 206 to command the native channel 194 to forego normal ECC and/or RLL decoding altogether, or to command the channel to ignore detected errors in the recovered data, thereby avoiding unfruitful error recovery attempts or error declarations. Servo data portions of the readback signals, on the other hand, are preferably demodulated by the native channel 194 in an otherwise conventional fashion to facilitate generation of the next set of user data signals (e.g., maintaining the associated head on-track so the next data sectors can be read, etc.).

It is generally contemplated that, in at least some cases, some type of user data pattern may be obtained by the native channel 194 and output to the native buffer 196 irrespective of the channel configuration emulated by the evaluation board 172. In such cases, the data pattern recovered by the native device may be evaluated by the evaluation board or end user to provide further information or insight useful in the evaluation process.

As shown by steps 264 and 266, the signals from the signal generator 192 are concurrently intercepted by the adapter assembly 174 in a manner as discussed above, and forwarded to the emulated channel 202 for signal reconstruction and outputting to the evaluation board buffer 204. Preferably, the adapter assembly 174 and the emulated channel 202 will operate seamlessly so that the native device is not "aware" to any significant extent that the data are being preempted and evaluated by the separate evaluation board 172. The use of the native device 172 also allows the operation of steps 264 and 266 to be carried out continuously for an extended period of time, including multiple reads of the same data and seeks to new tracks and new head combinations, thereby allowing the emulated channel to operate under real world conditions at different frequency rate zones, and in the face of various servo related functions.

FIG. 11 further shows that additional processing takes place at step 268, which may include further testing as discussed above for different emulated channel configurations. Although not required, it is contemplated that ultimately FIG. 11 will result in the selection of one or more channel designs that provide performance in accordance with preselected specifications. Thus, the routine is suitable for any number of applications, such as new product development (using an engineering model with the mechanical and electronics of the eventually configured product), supplier qualification for a new source of channels for an existing product, customer evaluation testing, etc.

It is further contemplated that various different signal generator configurations can be evaluated for a given channel configuration. For example, a new style of head or medium can be evaluated to evaluate compatibility with a given set of channels. This can be helpful, for example, in component standardization efforts when a variety of different products utilize the same types of heads, discs, preamps, etc.

For purposes of the appended claims, the terms "channel," "communication channel" and the like will be construed in accordance with the foregoing discussion as a device configured to apply signal processing to reconstruct data from an input data signal, such as exemplified by the various channels depicted in FIGS. 2, 5-6 and 9-10.

The term "control signal" will be construed in accordance with the foregoing discussion as a logic signal having a state transition edge that enables or disables a circuit, such as but not limited to the various exemplary assertion, enable and gate signals set forth in FIG. 10. A power supply signal that applies power to a circuit, or a clock signal that supplies a repetitive clocking input to a circuit, is insufficient to qualify as a control signal as claimed.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular control environment without departing from the spirit and scope of the present invention.

What is claimed is:

1. An apparatus comprising an adapter assembly configured to establish a communication path between a data processing device and a data evaluation device, the data processing device comprising a signal generator and a native channel, the data evaluation device comprising an emulated channel, the adapter assembly configured to intercept a data signal forwarded from the signal generator to the native channel so that the intercepted data signal is concurrently forwarded in parallel to the native channel and to the emulated channel for successful decoding by the emulated channel and unsuccessful decoding by the native channel.

2. The apparatus of claim 1, wherein the data processing device is characterized as a data storage device, and the signal generator of said data storage device comprise:
   a storage memory, a transducer head and a preamplifier/driver circuit which interfaces with the transducer head.

3. The apparatus of claim 1, wherein the native channel further provides at least one control signal to the signal generator to initiate generation of the data signal.

4. The apparatus of claim 1, wherein the adapter assembly comprises:
   conditioning circuitry which conditions the data signal output by the signal generator prior to reconstruction by the emulated channel.

5. The apparatus of claim 1, wherein the adapter assembly comprises:
   a flex adapter comprising a plurality of electrical contact pads configured for insertion between a connector of the data processing device and a control board of the data processing device on which the native channel is disposed the data signal is concurrently forwarded along the adapter assembly to the emulated channel and along the control board to the native channel.

6. The apparatus of claim 1, wherein the adapter assembly further operates to apply a write data signal generated by the emulated channel to the signal generator, and wherein the user data portion of the data signal comprises a readback signal transduced by the signal generator from a recording pattern generated by the signal generator in response to the write data signal.

7. The apparatus of claim 1, wherein the data signal is characterized as a user data signal, and the adapter assembly is further configured such that a servo data signal is transduced by the signal generator from an embedded servo field and successfully decoded by the native channel during operation of the emulated channel to successfully decode the user data signal.

8. An apparatus comprising:
a native device comprising a signal generator coupled to a native communication channel of the native device;
a data evaluation board comprising an emulated communication channel with a parametric configuration that is different from a parametric configuration of the native communication channel; and
first means for coupling the signal generator to the emulated communication channel so that during operation of the native device, data signals are concurrently forwarded in parallel to the native communication channel and to the emulated communication channel, wherein the emulated communication channel successfully decodes said forwarded data signals and the native communication channel does not successfully decode said forwarded data signals.

9. The apparatus of claim 8, wherein the native communication channel decodes a servo data portion of the data signal and the emulated communication channel concurrently decodes a user data portion of the data signal.

10. The apparatus of claim 8, wherein the native device comprises a data storage device and the signal generator comprises a storage memory, a transducer head and a preamplifier/driver circuit which interfaces with the transducer head.

11. The apparatus of claim 8, wherein the first means comprises an adapter assembly with conditioning circuitry which conditions the data signal output by the signal generator prior to reconstruction by the emulated communication channel.

12. The apparatus of claim 11, wherein the adapter assembly is characterized as a flex adapter comprising a plurality of electrical contact pads configured for insertion between a connector of the native device and a control board of the native device on which the native channel is disposed so that the data signal is concurrently forwarded along the adapter assembly to the emulated channel and along the control board to the native communication channel.

13. The apparatus of claim 8, wherein the at least one control signal comprises a read gate signal, and wherein the first means further comprises means for passing the read gate signal from the native communication channel to the signal generator to enable outputting of the data signal to the emulated communication channel.

14. The apparatus of claim 8, wherein the data signal output by the signal generator is characterized as a readback signal comprising a user data portion and a servo data portion, wherein the first means further comprises means for applying a write data signal generated by the emulated communication channel to the signal generator to store a pattern in response thereto, and wherein the user data portion of the readback signal is transduced by the signal generator from said stored pattern.

15. A method comprising steps of:
coupling an adapter assembly between a native device and a data evaluation device to establish a communication path having a first end between a signal generator of the native device and a native channel of the native device and a second end in communication with an emulated channel of the data evaluation device;
using the signal generator to generate a data signal; and
recovering a first set of data from the generated data signal using the native channel, and concurrently recovering a second set of data from the generated data signal using the emulated channel, wherein the native channel fails to successfully recover the second set of data from the generated data signal.

16. The method of claim 15, wherein the native device comprises a data storage device and the signal generator comprises a head-disc interface coupled to a preamplifier/driver circuit.

17. The method of claim 16, wherein the adapter assembly comprises a flex adapter comprising a plurality of electrical contact pads configured for insertion between a bulkhead connector of the native device and a control board of the native device on which the native channel is disposed so that the common set of signals are concurrently forwarded along the flex adapter to the emulated channel and along the control board to the native channel.

18. The method of claim 16, wherein the first set of data are characterized as servo data, and wherein the second set of data are characterized as user data, wherein the servo data are embedded within the user data.

19. The method of claim 16, wherein the using step comprises outputting at least one control signal from the native channel to the signal generator, and generating the data signal in response to the at least one control signal.

20. The method of claim 16, wherein the using step comprises providing a command to the native device from the data evaluation device to initiate the generation of the data signal, said command transmitted along a second communication path established between the native device and the data evaluation device.

* * * * *